United States Patent
Sen et al.

(10) Patent No.: US 8,433,012 B2
(45) Date of Patent: Apr. 30, 2013

(54) TIMING SYNCHRONIZATION METHOD AND APPARATUS IN A WIRELESS COMMUNICATION SYSTEM

(75) Inventors: Debarati Sen, Yongin-si (KR); Kiran Bynam, Yongin-si (KR); Jinesh P Nair, Yongin-si (KR); Arun Naniyat, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/225,722

(22) Filed: Sep. 6, 2011

(65) Prior Publication Data
US 2011/0317792 A1    Dec. 29, 2011

Related U.S. Application Data

(63) Continuation of application No. PCT/KR2011/000642, filed on Jan. 31, 2011.

(30) Foreign Application Priority Data

Feb. 19, 2010   (IN) .............................. 430/CHE/2010

(51) Int. Cl.
   *H04L 27/06*   (2006.01)
(52) U.S. Cl.
   USPC ........................................................ 375/343
(58) Field of Classification Search .................. 375/340, 375/343, 346, 355, 358
   See application file for complete search history.

(56) References Cited

U.S. PATENT DOCUMENTS

| | | | |
|---|---|---|---|
| 7,035,353 B2 * | 4/2006 | Fimoff et al. | 375/340 |
| 7,173,992 B2 | 2/2007 | Frigon | |
| 7,342,972 B1 | 3/2008 | Giannakis et al. | |
| 7,738,548 B2 * | 6/2010 | Roberts et al. | 375/233 |
| 7,778,363 B2 | 8/2010 | Inagawa et al. | |
| 2009/0161808 A1 | 6/2009 | Cheong et al. | |
| 2009/0168908 A1 | 7/2009 | Lee et al. | |
| 2010/0135447 A1 * | 6/2010 | Sapozhnykov et al. | 375/362 |

FOREIGN PATENT DOCUMENTS

| | | |
|---|---|---|
| KR | 10-2007-0017444 A | 2/2007 |
| KR | 10-2009-0013738 A | 2/2009 |
| KR | 10-0893737 | 4/2009 |

OTHER PUBLICATIONS

International Search Report mailed Sep. 29, 2011, in counterpart International Application No. PCT/KR2011/000642 (5 pages, including English translation).

Bai, "Distributed Detection in UWB Wireless Sensor Networks," *IEEE Transactions on Signal Processing*, vol. 58 No. Feb. 2010, p. 804-813.

Liu, et al., "Energy efficient and MUI-free synchronization for UWB based Wireless sensor networks," *The 17th Annual IEEE International Symposium on Personal, Indoor and Mobile Radio Communications (PIMRC'06)*, Sep. 11-14, 2006, p. 1-5.

* cited by examiner

*Primary Examiner* — Khanh C Tran
(74) *Attorney, Agent, or Firm* — NSIP Law

(57) ABSTRACT

Provided are a timing synchronization method and apparatus in a wireless communication system that may synchronize timing based on channel energy having a low Signal to Noise Ratio (SNR) in a wideband (WB) system. The timing synchronization apparatus in the wireless communication system may capture optimal channel energy by performing a comparison using a timing estimation scheme based on a correlation peak.

18 Claims, 3 Drawing Sheets

TIMING SYNCHRONIZATION METHOD AND APPARATUS IN A WIRELESS COMMUNICATION SYSTEM

CROSS-REFERENCE TO RELATED APPLICATION(S)

This application is a continuation application of International Patent Application No. PCT/KR2011/000642, filed on Jan. 31, 2011, which claims the benefit of India Patent Application No. 430/CHE/2010 filed on Feb. 19, 2010, the entire disclosures of which are incorporated herein by reference for all purposes.

BACKGROUND

1. Field

The following description relates to a timing synchronization method and apparatus in a wireless communication system, and additionally, to a method for estimating a timing of a received signal in a wideband (WB) channel or an ultra wideband (UWB) channel of a low power system.

2. Description of Related Art

Generally, a wideband (WB) wireless communication and an ultra wideband (UWB) wireless communication have been used in current and future communication technology due to the growing need for supporting a high data transmission rate, for example, of hundreds of megabits. Recently, transmitters having low power, low cost, and low interference in a WB communication system and a UWB communication system, corresponding to a wireless personal area network (WPAN), have become important. As such, there has been high demand for development of a system that has a high data transmission rate using low power.

SUMMARY

In one general aspect, there is provided a timing synchronization method in a wireless communication system, the method including outputting a first Cross Correlation Function (CCF) by cross correlating a channel output function, and a training sequence of a received signal, and estimating a timing of the received signal to obtain a Signal to Noise Ratio (SNR) that is less than a predetermined value, based on the outputted first CCF.

The method may further comprise cross correlating the first CCF and a second CCF that has a training sequence length that is different from a length of a training sequence of the first CCF, to obtain a Cross Correlation of Cross Correlation Function (CCCF), and calculating channel energy based on the CCCF.

The estimating of the timing may comprise estimating an instant at which the channel energy reaches a maximum, to be the timing.

The estimating of the timing may comprise respectively selecting thresholds at which the channel energy reaches the maximum, in response to a plurality of channel models, comparing the selected thresholds, and estimating the timing based on the compared thresholds.

The method may further comprise selecting thresholds by estimating a Root Mean Square (RMS) delay spread of a previous packet, and capturing channel energy that has a delay spread that is greater than a predetermined standard, based on the selected thresholds and the CCCF.

The method may further comprise selecting thresholds associated with an estimation of the timing based on an RMS delay spread measured in a channel of a first frame, and updating the selected thresholds based on the estimation of the RMS delay spread of an estimated channel.

The estimating of the timing may comprise estimating the timing by feeding back an estimation of an RMS delay spread of an estimated channel.

The method may further comprise coarsely estimating the timing by repeating a maximum length sequence a predetermined number of times.

The method may further comprise selecting thresholds associated with an estimation of the timing by boosting the SNR.

In another aspect, there is provided a timing synchronization method in a wireless communication system, the method including calculating channel energy that has a Signal to Noise Ratio (SNR) that is less than a predetermined value from a received signal, and estimating an instant at which the channel energy reaches a maximum to be a timing of the signal.

The estimating of the instant to be the timing of the signal may comprise outputting a first Cross Correlation Function (CCF) by cross correlating a channel output function and a training sequence of the signal, and estimating the timing based on the outputted first CCF.

The estimating of the instant to be the timing of the signal may comprise selecting thresholds at which channel energy included in different channel models reaches the maximum, and estimating the timing by comparing the selected thresholds.

The method may further comprise outputting a Cross Correlation of Cross Correlation Function (CCCF) by cross correlating the first CCF and a second CCF that has a training sequence length that is different from a length of a training sequence of the first CCF, and capturing channel energy that has a delay spread that is greater than a predetermined standard based on the selected thresholds and the outputted CCCF.

In another aspect, there is provided a timing synchronization apparatus, including a Cross Correlation Function (CCF) block to output a first CCF by cross correlating a channel output function and a training sequence of a received signal, and a timing estimation unit to estimate a timing of the signal to obtain a Signal to Noise Ratio (SNR) that is less than a predetermined value, based on the outputted first CCF.

The apparatus may further comprise a Cross Correlation of Cross Correlation Function (CCCF) block to output a CCCF by cross correlating the first CCF and a second CCF that has a training sequence length that is different from a length of a training sequence of the first CCF, wherein the timing estimation unit calculates channel energy based on the outputted CCCF, and estimates an instant at which the calculated channel energy reaches a maximum to be the timing.

The apparatus may further comprise a threshold selection unit to respectively select thresholds at which the channel energy reaches a maximum, in response to a plurality of channel models, and a threshold comparison unit to respectively compare the selected thresholds, in response to the plurality of the channel models, wherein the timing estimation unit estimates the timing based on the compared thresholds.

The apparatus may further comprise a threshold selection unit to select thresholds by estimating a Root Mean Square (RMS) delay spread of a previous packet, and a channel estimation unit to capture channel energy that has a delay spread that is greater than a predetermined standard based on the selected thresholds and the CCCF.

The apparatus may further comprise a threshold selection unit to select thresholds associated with an estimation of the timing based on an RMS delay spread measured in a channel of a first frame.

The timing estimation unit may update thresholds that are associated with an estimation of the timing based on an estimation of an RMS delay spread of an estimated channel, and estimate the timing by feeding back the estimation of the RMS delay spread of the channel.

The timing estimation unit may estimate the timing by repeating a maximum length sequence a predetermined number of times.

Other features and aspects may be apparent from the following detailed description, the drawings, and the claims.

Figure 1:
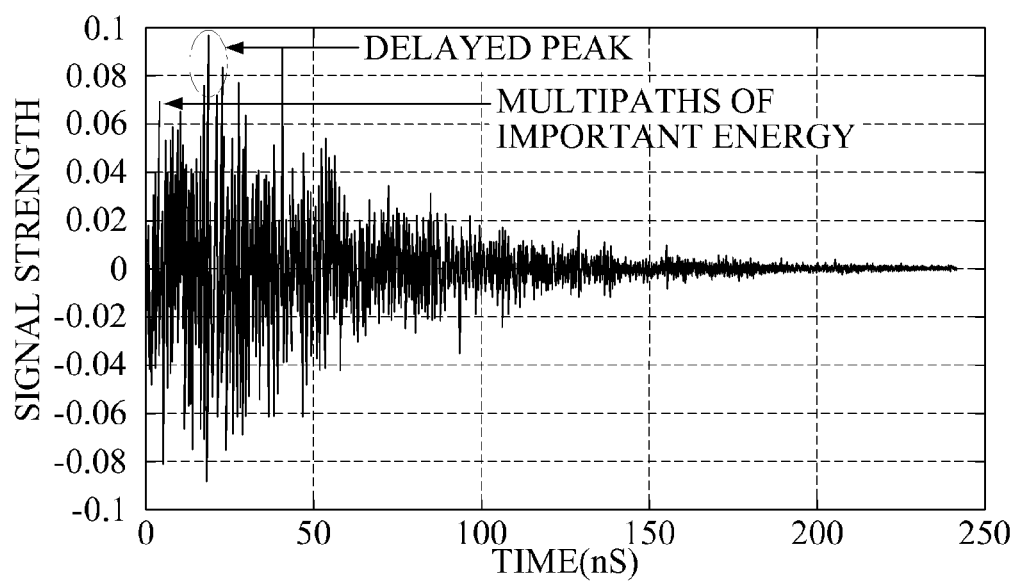
FIG. 1 is a diagram illustrating an example of a graph with respect to an impulse response of a high delay spread channel model obtained from an IEEE802.15.4a channel.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a graph with respect to an impulse response of a high delay spread channel model obtained from an IEEE802.15.4a channel.

A receiver that processes a baseband signal may estimate an accurate timing instant of a received signal. However, the timing may be difficult to process using a low power system in a wideband (WB) channel or an ultra wideband (UWB) channel which may have a high delay spread of 100 to 150 seconds.

Referring to FIG. 1, a multipath channel may arrive at a cluster. For example, a majority of strong multipaths may subsequently arrive at the cluster, and multipaths having important energy may arrive at the cluster prior to the strong multipaths. Furthermore, a low transmission power may use high resolution multipaths that may have a long search time, and use an accumulation result of a phase in a search window that may result in a complex timing estimation. Accordingly, a conventional correlation-based timing estimation may make a mistake by locking the delayed strong multipaths in a high delay spread channel, or may capture less channel energy for an additional signal in a maximum channel peak locked receiver.

According to various examples herein, a timing synchronization method may be associated with a timing estimation of a received signal in a high distributed WB channel or in a UWB channel. A delay spread of the WB channel or the UWB channel may be extended, for example, extended to be greater than 150 seconds in various environments. Accordingly, a timing estimation method based on energy, may accurately estimate a timing instant of a first multipath, and may provide improvement in a synchronization probability based on a peak synchronization method.

Figure 2:
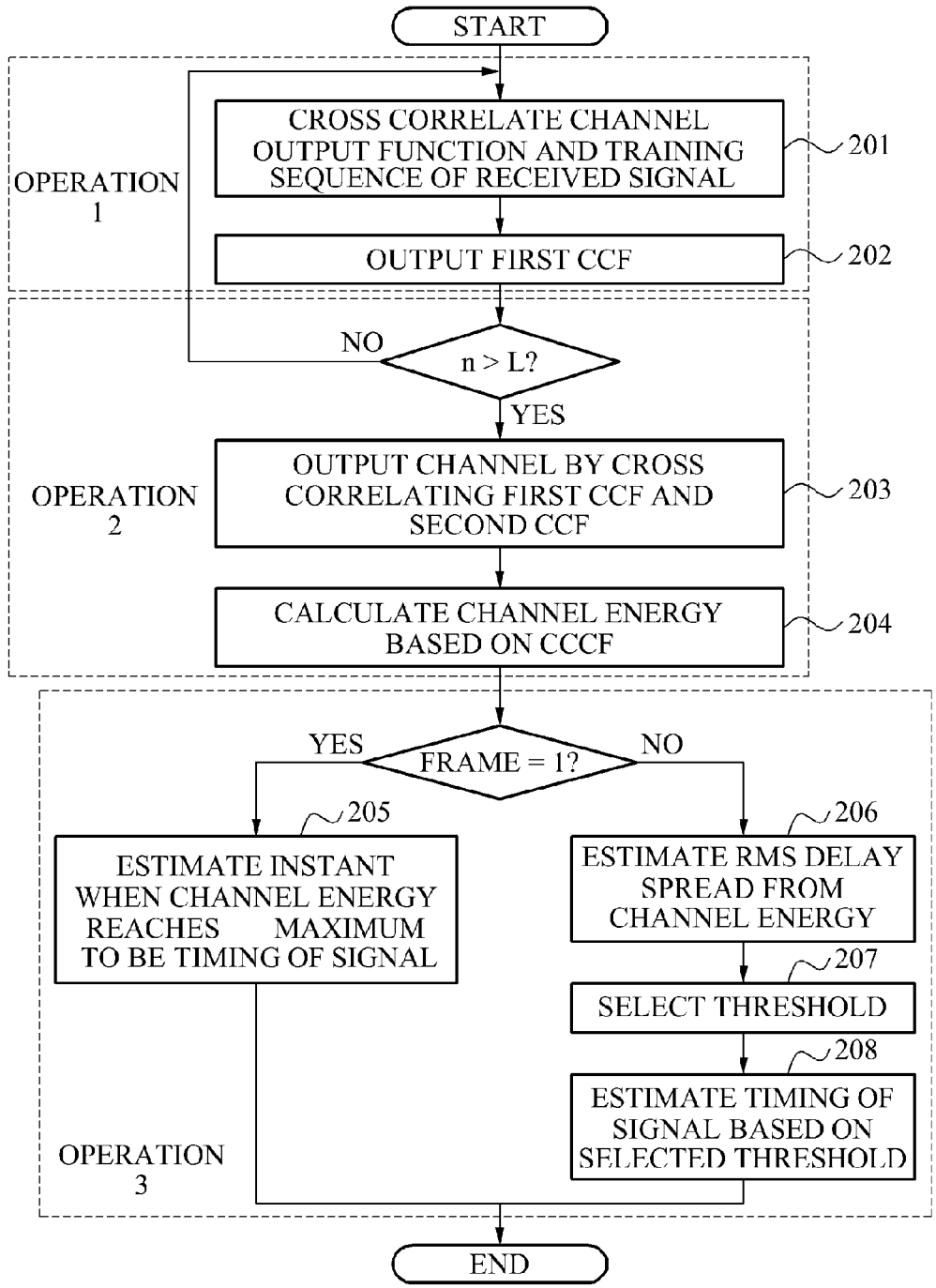
FIG. 2 is a diagram illustrating an example of a sequence of a timing synchronization method in a wireless communication system.

FIG. 2 illustrates an example of a sequence of a timing synchronization method in a wireless communication system.

The timing synchronization method may be based on energy. For example, the energy-based timing synchronization method may provide an efficient performance in a Signal to Noise Ratio (SNR) zone less than 3 dB. In this example, the timing synchronization method may estimate a timing based on a Cross Correlation Function (CCF) of two operations that are previously estimated. Also, the timing synchronization method may lock a first multipath, rather than a peak delayed by a proper threshold ranking in channel energy. The channel energy may be calculated based on a previously calculated Cross Correlation of Cross Correlation Function (CCCF).

Referring to FIG. 2, the timing synchronization method may perform operations 1 through 3.

Operation 1: Coarse Timing Estimation Example Based on CCF.

In 201, the timing synchronization method cross correlates a channel output function r(n) and a training sequence t(n) of a received signal.

In 202, the timing synchronization method outputs the cross correlated first CCF C($\tau$).

$$C(\tau) = \sum_{n=0}^{L-1} r(n+\tau)t^*(n) \quad \text{[Equation 1]}$$

$$0 \leq \tau \leq L-1$$

The first CCF may be used to calculate a timing that has a function level accuracy. As another example, the first CCF may provide a peak in strong multipaths. The timing synchronization method may estimate a coarse timing using the first CCF. For example, the timing synchronization method may estimate a timing that has a SNR that is less than a predetermined value such as 3 dB.

There are various methods for estimating a channel in transmission of a single frame. The estimating may include training sequence for a synchronization+training for a channel estimation+physical layer (PHY) header+media access control (MAC) header+payload, and a preamble including training sequence for a synchronization+training for a channel estimation. The timing synchronization method may output a second CCF C'($\tau$'−L) by setting the length (L) of the training sequence to be different from the L of the first CCF as shown in the example of Equation 2.

$$C'(\tau' - L) = \sum_{n=L}^{2L-1} r(n+\tau')t^*(n-L) \quad \text{[Equation 2]}$$

$$L \leq \tau' \leq 2L-1$$

The timing synchronization method may estimate timing information in the function level accuracy, using the first CCF.

Operation 2: Energy Calculation Example Based on CCCF

In 203, the timing synchronization method outputs a CCCF by cross correlating the first CCF and the second CCF.

In 204, the timing synchronization method calculates channel energy $E(\tilde{\tau})$ based on the CCCF as shown in the example of Equation 3.

$$|E(\tilde{\tau})| = \frac{\sum_{\tau''=\tilde{\tau}}^{\tilde{\tau}+l_{CM}-1} C(\tau'')C'^*(\tau'')}{\sigma^2_{C(\tau'')}\sigma^2_{C'(\tau'')}} \quad \text{[Equation 3]}$$

$$0 \le \tau'' \le L - l_{CM} - 1$$

$$l_{CM} < L$$

In this example, in 205, the timing synchronization method estimates an instant at which the channel energy reaches a maximum, as the timing of the received signal.

The channel energy may improve a signal power using a noise power, and a noise function may be uncorrelated. The timing synchronization method may select a threshold $l_{CM}$ while calculating the channel energy. For example, the threshold may be selected based on a Root Mean Square (RMS) delay spread estimation of the channel.

The timing synchronization method may improve the signal using the SNR at a front end of a receiver, by improving the power of the received signal instead of increasing the noise power.

Operation 3: Good Timing Estimation Example Based on Threshold Comparison

In 206, the timing synchronization method estimates an RMS delay spread from the channel energy.

In 207, the timing synchronization method selects thresholds that are associated with an estimation of the timing based on an RMS delay spread measured in a channel of a first frame.

In 208, the timing synchronization method respectively compares the selected thresholds in response to a plurality of channel models, and estimates the timing based on the compared thresholds.

As an example, the timing synchronization method may be performed using one of the following four cases.

Case 1: First Frame of First Packet (Packet=1, Frame=1)

For the first frame of the first packet, the timing synchronization method may estimate an instant at which an output of a CCCF reaches a maximum, to be a timing. In this example, an output of the CCDF may correspond to a channel energy. An RMS delay spread value may be estimated after a channel estimation, in conjunction with the coarse timing estimation.

Case 2: Other Frames of First Packet (Packet=1, Frame≠1)

A threshold λ may be selected based on a measured channel delay spread. For example, the timing synchronization method may select thresholds λ1 through λ8 in which the channel energy reaches a maximum, in response to a plurality of channel models CM1 through CM8. The thresholds may capture a first multipath in an environment that observes an envelope of the received signal through a wide simulation of the SNR.

For example, the timing synchronization method may select the threshold λ of the channel energy in which an output of the CCCF reaches the maximum, based in advance on a timing for a frame to be subsequently received.

Case 3: First Frame of Another Packet (Packet≠1, Packet=1)

In the first frame of the other packet, a threshold measured in a last frame of the previous packet may be determined with reference to a calculation of an instant of an initial approximate timing. An RMS delay spread value of the coarse timing estimation may be estimated after an estimation of a channel.

Case 4: Other Frames of the Other Packet (Packet≠1, and Frame≠1)

A good timing instant may be estimated by updating a threshold based on an RMS delay spread that may be estimated according to Case 2.

As an example, a transmission preamble in which the timing synchronization method may be applied, may coarsely estimate the timing by repeating a Maximum Length (ML) sequence having a predetermined length (L: 1023), a predetermined number of times (for example, three times).

As another example, the timing synchronization method may select thresholds that are associated with an estimation of the timing by boosting the SNR.

Accordingly, a proper selection of the thresholds may lock the first multipath, and may maximize channel energy by capturing the optimal channel energy.

An equation that may be applied for each of the cases may be expressed by Equation 4.

$$\hat{\tau} = \tilde{\tau}|_{E(\tau)|=max(|E(\tau)|)} \text{ if packet} = 1, \text{ frame} = 1$$

$$\hat{\tau} = \tilde{\tau}|_{E(\tau)|\ge \lambda_{packet-1,frame_{last}} \times max(|E(\tau)|)} \text{ if packet} \ne 1, \text{ frame} = 1$$

$$\hat{\tau} = \tilde{\tau}|_{E(\tau)|\ge \lambda_{CM} \times max(|E(\tau)|)} \begin{cases} \text{if packet} \ne 1, \text{ frame} \ne 1 \\ \text{or packet} = 1, \text{ frame} \ne 1 \end{cases}$$

[Equation 4]

A simulation result of the timing synchronization method is hereinafter described.

A performance of the timing synchronization method may be estimated through a simulation in a plurality of IEEE802.15.4a channel models, for example, CM1 through CM8. The channels may be described using various lines of sight (LOS), and non-lines of sight (NLOS), for example, in a residence, an office, the outdoors, an industrial environment, and the like.

As an example, the channels may encounter an RMS delay spread of a range between 16 seconds for CM1 and 90 seconds for CM8 over a distance of 2 m to 28 m. In the simulation, 1000 packets are transmitted in a realization of 100-noise channels of each of the channel models that may evaluate the performance of the timing synchronization method. The simulation is carried out over a SNR of a range between 0 to 10 dB. The timing synchronization method may be applicable to a low power receiver that may be designed for a WB and UWB, and a performance of the timing synchronization method may also be observed in an SNR zone that is less than 3 dB.

The performance of the timing synchronization method may be measured based on the example factors as follows.

(1) Accurate Synchronization Probability:

Table 1 illustrates an example of an accurate synchronization probability for a different SNR and a different channel model.

TABLE 1

| SNR | CM1 (low delay spread) | CM3 (medium delay spread) | CM8 (high delay spread) |
|---|---|---|---|
| 0 dB | 96.16% | 93.45% | 70.97% |
| 2 dB | 96.11% | 93.49% | 77.47% |
| 6 dB | 96.22% | 93.59% | 85.72% |
| 10 dB | 96.44% | 93.69% | 89.67% |

As shown in Table 1, 96%, 93%, and 77% of a channel having a very low SNR of 2 dB are synchronized in relatively low, medium, and high delay spread channels, respectively.

Table 2 illustrates an example of a probability comparison of an accurate synchronization between a peak detection method and the proposed synchronization method.

TABLE 2

| | CM1 | | CM3 | | CM8 | |
|---|---|---|---|---|---|---|
| SNR | Peak detection method | Proposed method | Peak detection method | Proposed method | Peak detection method | Proposed method |
| 0 dB | 92.39% | 96.16% | 86.39% | 93.45% | 39.22% | 70.97% |
| 2 dB | 92.86% | 96.11% | 86.5% | 93.49% | 40.73% | 77.47% |

As shown in the example of Table 2, when comparing an example of a performance of the proposed method with a performance of the conventional peak detection method, a 50% improvement is observed when compared to a synchronization of the peak detection method in a bad state of the channel CM8. As illustrated in Table 2, the improvement is also observed in low and medium delay spread channel models. As described above, the timing synchronization method may be efficient in high channel energy that may be captured in a high delay spread channel.

Table 3 illustrates an example of an accuracy comparison of synchronizations.

TABLE 3

| Parameter | MB-OFDM UWB (Worst case channel of IEEE 802.15.3a: delay- 25 n sec) | Sub band UWB (Worst case channel of IEEE 802.15.4a: delay- 100 n sec) |
|---|---|---|
| Correct synchronization probability | 71.78% (at 17 dB SNR) | 85.72% (at 6 dB) 90% (at 10 dB) |

Table 3 corresponds to an accuracy comparison of synchronizations between a low power sub band UWB system that uses the timing synchronization method according to various examples herein, and a Multi Band Orthogonal Frequency Division Multiplexing (MB-OFDM) that uses the conventional timing synchronization method. As shown in Table 3, the performance of the timing synchronization method according to various examples performs better in a low SNR zone.

(2) Probability of Missed Detection

As shown herein, a probability of missed detection may be less than 5% in the UWB channel models CM1 through CM8.

Accordingly, the timing synchronization method may have high efficiency and a channel configuration of a high delay spread channel in a 0 dB SNR zone may be synchronized greater than 70%. For example, the timing may be synchronized in the 0 dB SNR zone, and probabilities of a low delay of 96%, a medium delay of 93%, and a high delay of 71% are observed.

Also, a high synchronization probability may guarantee a better channel estimation, and may provide an improved bit error rate (BER).

The performance in the low SNR zone may empower an authority to a low transmission application of a WB system and a UWB system.

A conventional UWB application may stream multimedia, and may transmit a large file that requires back to back packet transmission, whereas the timing synchronization method according to various example may be helpful because the channel condition may be less significant.

Figure 3:
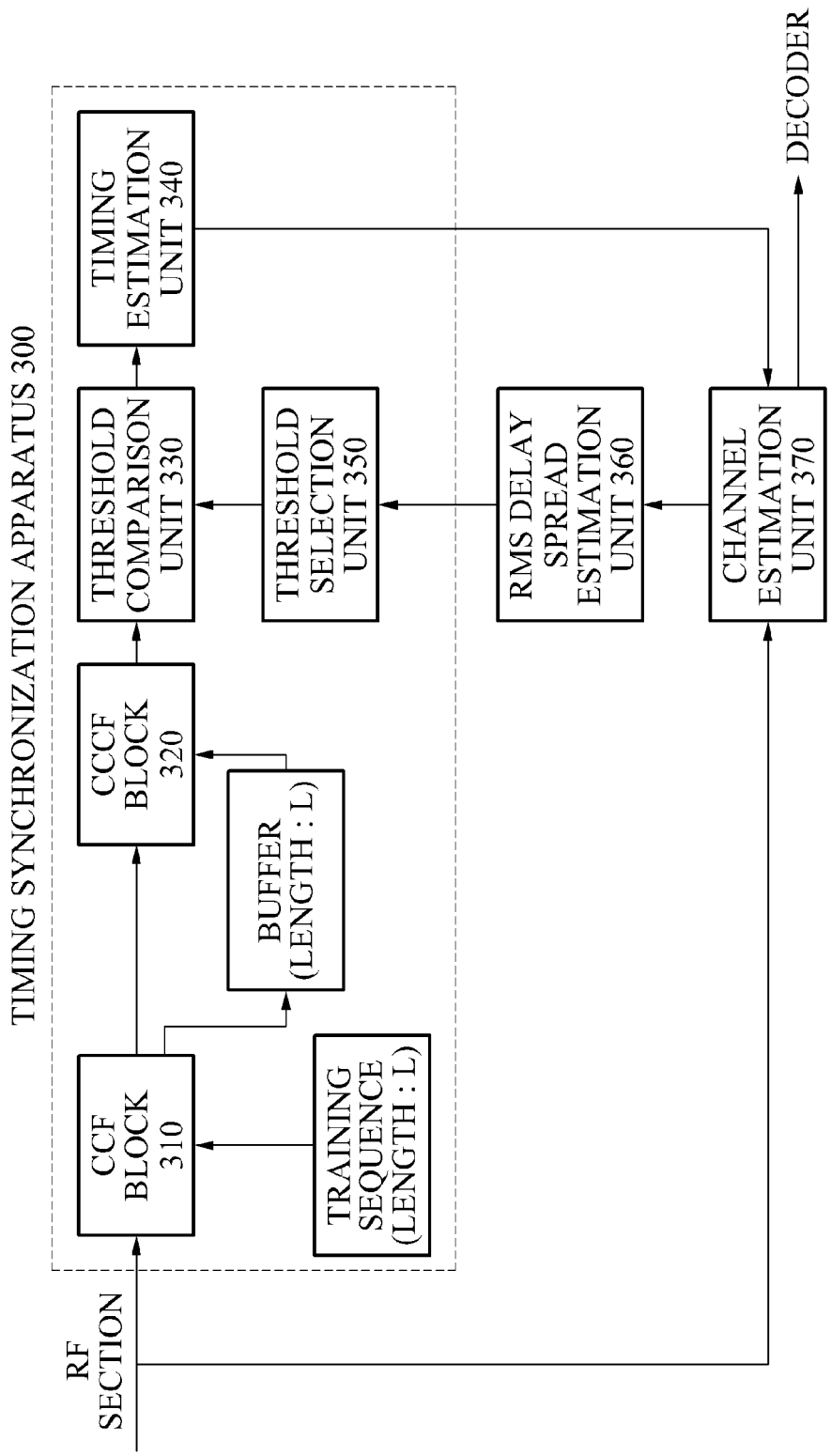
FIG. 3 is a diagram illustrating an example of a timing synchronization apparatus.

FIG. 3 illustrates an example of a timing synchronization apparatus. The timing synchronization apparatus may be or may be included in a terminal, such as a mobile terminal, a smart phone, a camera, a server, computer, a home appliance, an MP3 player, and the like.

Referring to FIG. 3, timing synchronization apparatus 300 includes a CCF block 310, a CCCF block 320, a threshold comparison unit 330, a timing estimation unit 340, a threshold selection unit 350, an RMS delay spread estimation unit 360, and a channel estimation unit 370.

The CCF block 310 may output a first CCF by cross correlating a channel output function and a training sequence of a received signal. The CCF block 310 may output a second CCF by cross correlating a second training sequence that has a length that is different from a length of the first CCF.

The timing estimation unit 340 may estimate a timing of the signal that may enable obtaining an SNR that is less than a predetermined value, based on the outputted first CCF. For example, the timing may be coarsely estimated based on the first CCF.

The CCCF block 320 may output a CCCF by cross correlating the first CCF and the second CCF.

The timing estimation unit 340 may calculate channel energy based on the outputted CCCF, and may estimate an instant at which the calculated channel energy reaches a maximum, as the timing.

For example, the threshold selection unit 350 may select thresholds such as $\lambda 21$ to $\lambda 8$, in which the channel energy reaches the maximum, in response to a plurality of channel models, for example, channel models CM1 through CM8.

The threshold comparison unit 330 may compare the selected thresholds in response to the plurality of the channel models, for example, the channel models CM1 through CM8.

The timing estimation unit 340 may estimate the timing based on the compared thresholds.

According to various examples, the RMS delay spread estimation unit 360 may estimate an RMS delay spread of a channel. The threshold selection unit 350 may select thresholds from the estimated RMS delay spread. The threshold selection unit 350 may select thresholds that are associated with an estimation of the timing based on an RMS delay spread measured in a channel of a first frame. The threshold selection unit 350 may select thresholds that are associated with an estimation of the timing by boosting the SNR.

The channel estimation unit 370 may capture optimal channel energy that has a delay spread that is greater than a predetermined standard, based on the selected thresholds and the CCCF.

The timing estimation unit 340 may update thresholds associated with an estimation of the timing, based on an estimation of an RMS delay spread of an estimated channel, and may estimate the timing by feeding back the estimation of the RMS delay spread of the channel.

The timing estimation unit 340 may estimate the timing by repeating a maximum length sequence a predetermined number of times. The maximum length sequence may have a predetermined length.

According to various examples, it is possible to provide an innovative approach to lock a first multipath. A timing having a sample level accuracy may be estimated. It is possible to synchronize an accurate timing having a Signal to Noise Ratio (SNR) less than 3 dB. Accordingly, it is possible to perform an operation in a low SNR zone of a high delay spread channel, using a general ultra wideband (UWB) receiver in a wireless personal area network (WPAN).

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and or if components in a described system, architecture, device, or circuit are combined in a different manner and/or replaced or supplemented by other components or their equivalents. Accordingly, other implementations are within the scope of the following claims.

The invention claimed is:

1. A timing synchronization method in a wireless communication system, the method comprising:
    outputting a first Cross Correlation Function (CCF) by cross correlating a channel output function, and a training sequence of a received signal;
    outputting a Cross Correlation of Cross Correlation Function (CCCF) by cross correlating the first CCF and a second CCF that comprises a training sequence length that is different from a length of the training sequence of the first CCF;
    calculating channel energy based on the CCCF; and
    estimating a timing of the received signal to obtain a Signal to Noise Ratio (SNR) that is less than a predetermined value, based on the calculated channel energy.

2. The method of claim 1, wherein the estimating of the timing comprises estimating an instant at which the calculated channel energy reaches a maximum, to be the timing.

3. The method of claim 1, wherein the estimating of the timing comprises:
    respectively selecting thresholds at which the channel energy reaches a maximum, in response to a plurality of channel models;
    respectively comparing the selected thresholds; and
    estimating the timing based on the compared thresholds.

4. The method of claim 1, further comprising:
    selecting thresholds by estimating a Root Mean Square (RMS) delay spread of a previous packet; and
    capturing optimal channel energy that comprises a delay spread that is greater than a predetermined standard, based on the selected thresholds and the CCCF.

5. The method of claim 1, further comprising:
    selecting thresholds associated with the estimation of the timing based on a Root Mean Square (RMS) delay spread measured in a channel of a first frame; and
    updating the selected thresholds based on an estimation of a RMS delay spread of an estimated channel.

6. The method of claim 1, wherein the estimating of the timing comprises estimating the timing by feeding back an estimation of a Root Mean Square (RMS) delay spread of an estimated channel.

7. The method of claim 1, further comprising:
    coarsely estimating the timing by repeating a maximum length sequence a predetermined number of times.

8. The method of claim 1, further comprising:
    selecting thresholds associated with the estimation of the timing by boosting the SNR.

9. A timing synchronization method in a wireless communication system, the method comprising:
    calculating channel energy that comprises a Signal to Noise Ratio (SNR) that is less than a predetermined value, based on a received signal; and estimating an instant at which the calculated channel energy reaches a maximum, to be a timing of the received signal,
wherein the estimating of the instant comprises
selecting thresholds at which the channel energy included in different channel models reaches the maximum, and
estimating the timing by comparing the selected thresholds.

10. The method of claim 9, wherein the estimating of the instant comprises:
outputting a first Cross Correlation Function (CCF) by cross correlating a channel output function, and a training sequence of the signal; and
estimating the timing based on the outputted first CCF.

11. The method of claim 10, further comprising:
outputting a Cross Correlation of Cross Correlation Function (CCCF) by cross correlating the first CCF and a second CCF that comprises a training sequence length that is different from a length of the training sequence of the first CCF; and
capturing optimal channel energy that comprises a delay spread that is greater than a predetermined standard, based on the selected thresholds and the outputted CCCF.

12. A timing synchronization apparatus, comprising:
a Cross Correlation Function (CCF) block configured to output a first CCF by cross correlating a channel output function, and a training sequence of a received signal;
a Cross Correlation of Cross Correlation Function (CCCF) block configured to output a CCCF by cross correlating the first CCF and a second CCF that comprises a training sequence length that is different from a length of the training sequence of the first CCF; and
a timing estimation unit to
calculate channel energy based on the CCCF, and
estimate a timing of the signal to obtain a Signal to Noise Ratio (SNR) that is less than a predetermined value, based on the calculated channel energy.

13. The apparatus of claim 12, wherein the timing estimation unit is further configured to estimate an instant at which the calculated channel energy reaches a maximum, to be the timing.

14. The apparatus of claim 12, further comprising:
a threshold selection unit configured to respectively select thresholds at which the channel energy reaches a maximum, in response to a plurality of channel models; and
a threshold comparison unit configured to respectively compare the selected thresholds,
wherein the timing estimation unit is further configured to estimate the timing based on the compared thresholds.

15. The apparatus of claim 12, further comprising:
a threshold selection unit configured to select thresholds by estimating a Root Mean Square (RMS) delay spread of a previous packet; and
a channel estimation unit configured to capture optimal channel energy that comprises a delay spread that is greater than a predetermined standard, based on the selected thresholds and the CCCF.

16. The apparatus of claim 12, further comprising:
a threshold selection unit configured to select thresholds associated with the estimation of the timing based on a Root Mean Square (RMS) delay spread measured in a channel of a first frame.

17. The apparatus of claim 12, wherein the timing estimation unit is further configured to:
update thresholds associated with the estimation of the timing based on an estimation of a Root Mean Square (RMS) delay spread of an estimated channel; and
estimate the timing by feeding back the estimation of the RMS delay spread of the estimated channel.

18. The apparatus of claim 12, wherein the timing estimation unit is further configured to coarsely estimate the timing by repeating a maximum length sequence a predetermined number of times.

* * * * *